C. H. MONTGOMERY.
HEADER DEVICE.
APPLICATION FILED MAY 18, 1911.
1,104,213.
Patented July 21, 1914.
2 SHEETS—SHEET 2.
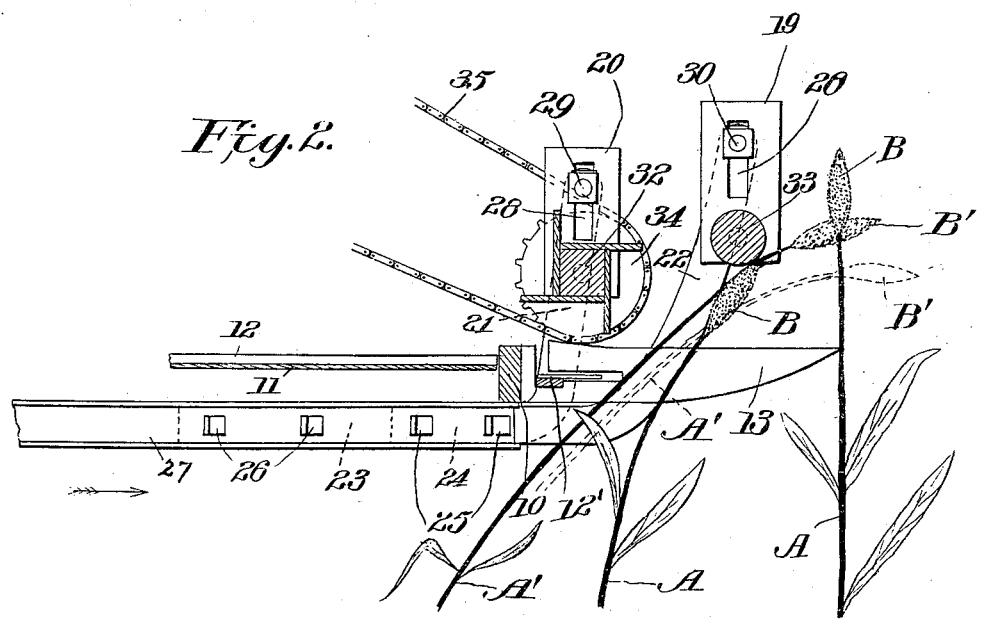
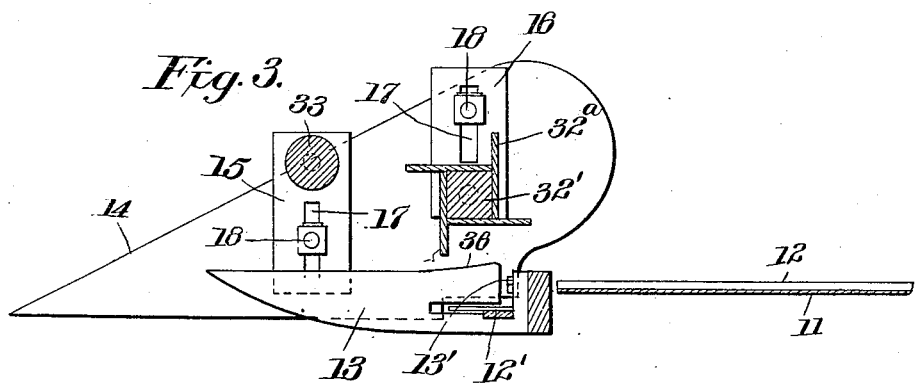
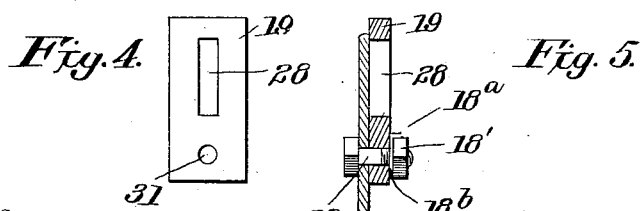

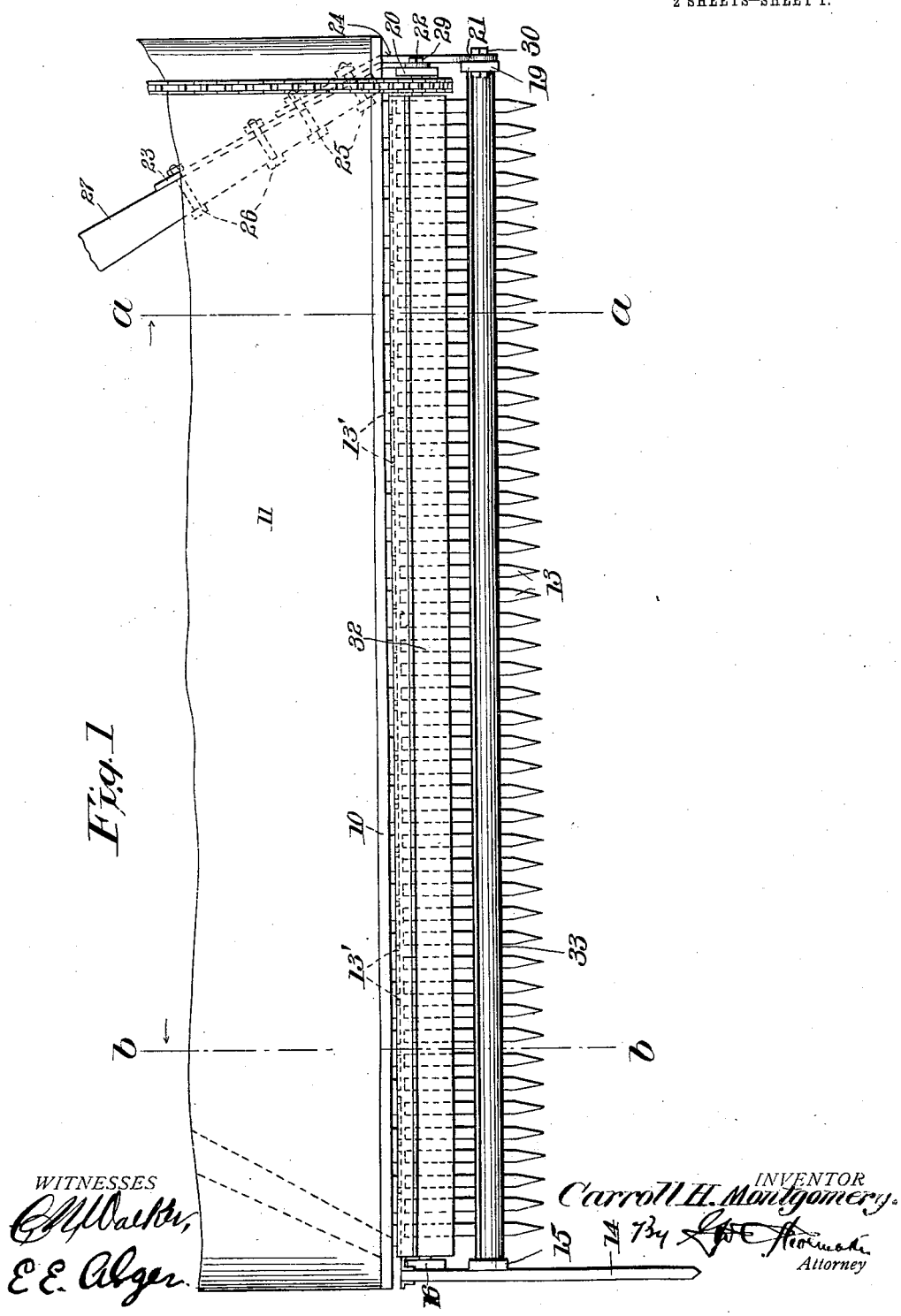

UNITED STATES PATENT OFFICE.

CARROLL HINCKLEY MONTGOMERY, OF WHITE DEER, TEXAS.

HEADER DEVICE.

1,104,213.  Specification of Letters Patent.  Patented July 21, 1914.

Application filed May 18, 1911. Serial No. 628,074.

*To all whom it may concern:*

Be it known that I, CARROLL HINCKLEY MONTGOMERY, citizen of the United States, residing at White Deer, in the county of Carson and State of Texas, have invented certain new and useful Improvements in Header Devices, of which the following is a specification.

This invention relates to header devices. One object is to provide means for heading maize, sorghum, kafir or other farm crops embodying such characteristics that it may be readily applied to any common type of header harvester and efficiently top the crops irrespective of the lengths of the stalks and insure the deposit of the heads on the header platform.

In the harvesting of maize, sorghum and kafir it is the custom to use wheat and similar headers and in their use considerable time and labor is involved. The heads frequently drop from the machine and too much of the stalk accompanies the heads while at other times the heads themselves are cut intermediate their ends.

It is therefore another object of my invention to provide a header mechanism embodying parts that may be arranged to harvest crops according to the lengths of the crops in various patches so that the heads will not drop from the machine and so that there will be uniformity in the cutting of the heads from the stalks.

A still further object is to provide a header device for header or other harvesters embodying means for cutting the stalks, a device for sweeping the cut portions of the stalks to the usual type of header platform together with means for bending or deflecting the longer stalks of the crop to insure cutting of all of the stalks between their heads and the fodder joints or blades.

It is still further designed to provide an inexpensive, simple, durable and efficient header harvester or an attachment for common types of header harvesters.

With the above and other objects in view, the invention consists in the construction and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings: Figure 1 is a top plan view of the invention. Fig. 2 is a transverse sectional view on the line $a$—$a$ of Fig. 1 looking in the direction of the arrow. Fig. 3 is a transverse sectional view on the line $b$—$b$ of Fig. 1 looking in the direction of the arrow. Fig. 4 is a detail perspective view of one of the bearing blocks for the sweeper and the deflecting or bending device. Fig. 5 is a sectional view through one of the bearing blocks and the divider board.

Referring now more particularly to the accompanying drawings, it will be understood at the outset that my invention may be secured to the framework of any suitable harvester machine, preferably secured in such a way as to have efficient coöperation with the header platform and cutting mechanism so that the heads may be efficiently fed to the platform from which latter they are taken from the machine in any well known manner.

In order that those skilled in the art to which my invention appertains may readily understand the same the character 10 indicates the front portion of any suitable type of header harvester provided with a header platform preferably in the form of an endless belt 11 which may or may not be reinforced by the strengthening ribs 12, the ribs facilitating the feed of the heads to the usual conveyer. (Not shown.)

Harvesters are provided with cutting apparatus, generally in the form of a cutter bar, such as 12′, operable in any suitable manner and arranged for coöperation with the guards or teeth 13, the guards being connected in this instance to the framework of the machine in any suitable manner, preferably by means of suitable fastenings 13′, and having their inner ends at the upper surface preferably directed upwardly at 36 to facilitate movement of the heads off the guards or fingers to the header platform 11. In other words, the guard fingers or teeth of the comb are preferably directed upwardly at 36 to a point above the platform 11 with their remaining upper portions preferably horizontal. The guards are generally spaced according to the nature of the crops to be harvested, but in the present instance, the guard fingers are comparatively long and spaced to an extent ample to provide preferably for the harvesting of maize, sorghum or kafir. The side faces of the teeth or guard fingers are preferably comparatively broad so as to overcome possibility of prematurely topping the maize, sorghum or kafir prior to the stalks being engaged by the cutting mechanism. The passages formed by the spaces between the teeth of the comb are unrestricted.

Projecting from the front of the harvester is a common or any other type of divider board 14 and to the inner side of this divider board I secure bearing blocks 15 and 16, each block having a slot 17 through which passes a bolt 18 and on which bolts the bearing blocks 15 and 16 may be adjusted vertically or swung for the purpose of otherwise adjusting the elements which are supported by the bearing blocks and which will be referred to hereinafter. When the bearing blocks are swung on their pivots they are secured in predetermined adjusted positions during the operation of the machine by means of the nuts 18′ which are preferably locked by the lips 18ª of the washers 18ᵇ, the bolts being manipulated instead of the nuts when it is desired to adjust the bearing blocks.

Coöperating with the bearing blocks 15 and 16 are bearing blocks 19 and 20, respectively, which latter are disposed at the opposite side of the machine and mounted preferably on the upwardly projecting portions 21 and 22, of the arms 23 and 24, respectively, the arms 23 and 24 being secured together and to the inclined beam 27 in any suitable manner, preferably by means of bolt and nut connection 25. As shown, the arm 24 is further secured to the inclined beam 27 by means of the bolt and nut connection 26.

The bearing blocks 19 and 20, like the bearing blocks 15 and 16, each has a slot 28, there being bolts 29 and 30 extending through the outer ends of the projecting portions 21 and 22 respectively of the respective arms 23 and 24 and also through the slots 28 of the bearing blocks 19 and 20 and by means of the nuts and washers 18′ and 18ᵇ, respectively, blocks 19 and 20 are held firmly on the projecting portions of said arms and may be adjusted in the same way that the opposite bearing blocks are adjusted and according to the adjustment of the first mentioned blocks.

The bearing blocks 16 and 20 are disposed preferably opposite to each other in close proximity to the header platform and have bearings 31 adapted to receive the journals at opposite ends of the reel, sweep, or other suitable element 32 designed to sweep the heads from the guards onto the header platform.

The bearing blocks 15 and 19 are preferably disposed opposite each other and in front of and preferably slightly above the sweeping element 32 and are adapted to receive the journals at the ends of the roller or other stalk bending or deflecting member 33. This member 33 is unconnected with the teeth of the comb and is loosely mounted in the bearing blocks 15 and 19 and is rotated under the influence of the stalks contacting therewith, exerting more or less pressure upon the roller as will be hereinafter more fully explained.

Maize, sorghum, kafir or other similar farm crops grow to different heights and the particular crops herein named are harvested with more or less difficulty because of the stalks being of different lengths. One method heretofore employed has been to cut the stalks irrespective of whether they be cut close to the heads, thereby frequently causing too much of the stalk to accompany the heads to the header platform and also permitting many heads to drop on the ground instead of being directed to the header platform.

In the use of my invention, very little of the stalk accompanies the heads to the header platform, the roller 33 being so arranged with respect to the guards 13 and the cutting mechanism as to provide for a severing of the stalks close to the bases of the heads so that the heads with very little stalks are delivered to the header platform.

The sweeping device 32 may be of any character, but as shown, consists of a core 32′ and wings 32ª and at one end of the sweeper is disposed a sprocket wheel 34 whereby the sweeper may be driven or rotated through the instrumentality of a chain 35 or other suitable connection between the sweeper and the usual reel shaft (not shown) or other part of the harvester.

It will be understood that the machine moves in the direction of the arrow (Fig. 2) and that during forward movement, the sweeping device 32 is set in operation. The teeth or guards 13 receive the stalks A between them and the device is adjusted according to the lengths of the crops which, in patches, vary from four to six feet more or less. Thus I provide for efficient harvesting, in that if certain of the crops should be of such length as not to engage the bending or deflecting device 33, such crops would be presented to the cutting apparatus with their heads B slightly above the cutter bar and be topped when the sweeper would cause such topped heads to be delivered to the header platform.

The longer stalks, in the use of my invention, are bent, sprung or deflected on the forward movement of the machine and are held out of contact with the cutting mechanism by the roller 33 until the roller passes over them at which time the cutting mechanism will cut the stalks between their heads and the uppermost fodder joint or blade, as may be understood by reference to Fig. 2. The result is that irrespective of the lengths of the stalks they are all cut above the fodder joints or blades, and in such condition swept from the teeth or guards 13 onto the header platform with comparatively little stalk, whereby I am enabled to save considerable time and labor and greatly reduce the cost of harvesting and subsequent threshing.

It will now be understood that the cutting mechanism is always the same distance from the deflecting device 33 and by reference to Fig. 2, and particularly to the stalk A′ it will be noted that the stalk is deflected considerably as compared with the deflection of the stalk A in advance of it. This stalk A′, however, will not reach the cutting mechanism until its head B′ passes from beneath the roller or deflecting device 33. The machine moving forwardly, the deflecting device and cutting mechanism are also moved forwardly and by the time the head B′ passes beneath the deflecting device 33 it has been deflected to a still greater extent, for instance, as may be understood by reference to the dotted lines in which stalk A′ is shown in Fig. 2 with the result that the further the deflection of the stalk the closer to the head the stalk is cut by the cutting mechanism, the cutting mechanism operating on the stalk at practically the same time or immediately upon the head springing from or leaving the deflecting device.

The deflecting device 33 is preferably formed of wood but any other suitable light material may be employed. In any event it is preferably loosely mounted so as to move when engaged by the stalks and thereby overcome undue wear and not cause a roughness likely to injure the heads.

What is claimed is:—

1. In a header harvester, a platform, a comb secured to the platform and having the upper face of its rear portion raised slightly to a point higher than the platform with the remaining upper face portions of the comb arranged upon substantially the same horizontal plane as the platform, a breasting element positioned over the comb to deflect the material and thereby direct the tops thereof toward the comb, a cutting mechanism arranged in substantially the same horizontal plane with the platform and comb and positioned to operate through the rear of the comb directly adjacent to the platform so as to cut the deflected material near the tops thereof, and a sweeper operable over the comb at the rear thereof to sweep the topped material from the point of the cutting operation directly from the comb on to the platform.

2. In a header harvester, a platform, a comb in substantially the same plane and communicating directly with the platform, a breasting element positioned over the comb to deflect the material and thereby direct the tops thereof toward the comb, a cutting mechanism also in substantially the same plane with the platform and comb and working through the rear of the comb directly adjacent to the platform so as to cut the deflected material near the tops thereof, and a sweeper operable over the comb at the rear thereof to sweep the topped material off the comb and drop it directly on to the platform.

In testimony whereof I affix my signature in presence of two witnesses.

CARROLL HINCKLEY MONTGOMERY.

Witnesses:
 JOHN H. SIGGERS,
 GEO. C. SHOEMAKER.